T. H. DOWNWARD.
WATER POWER SYSTEM.
APPLICATION FILED AUG. 14, 1911.
1,048,664.
Patented Dec. 31, 1912.
2 SHEETS—SHEET 2.
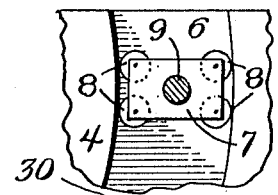
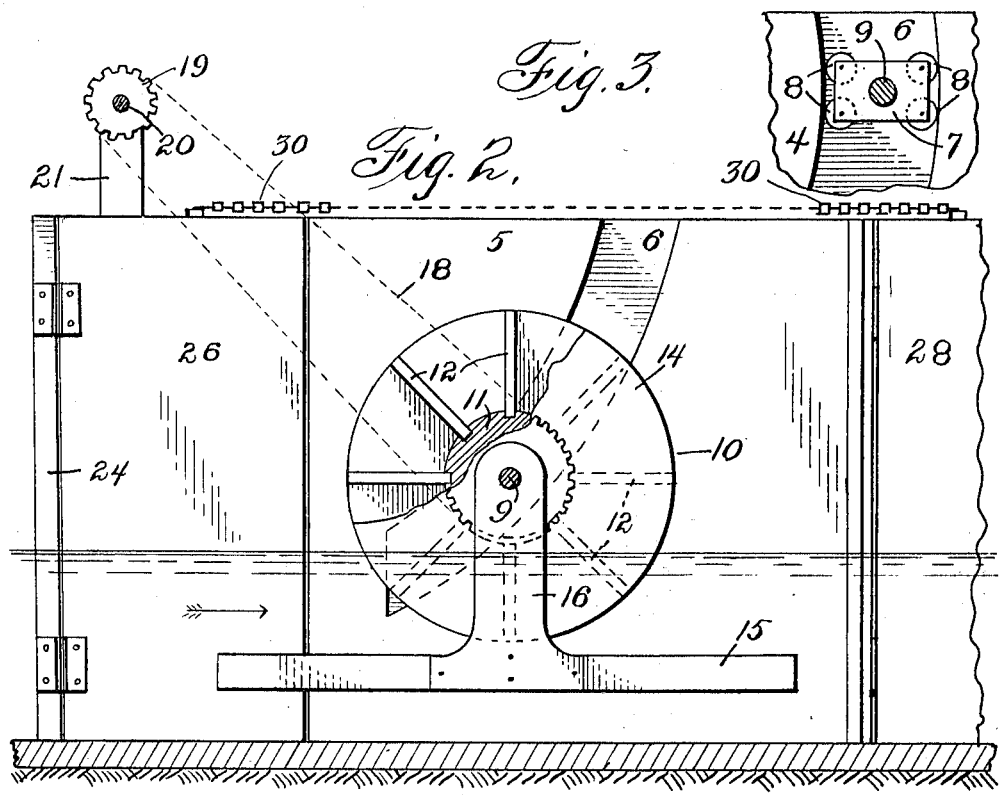
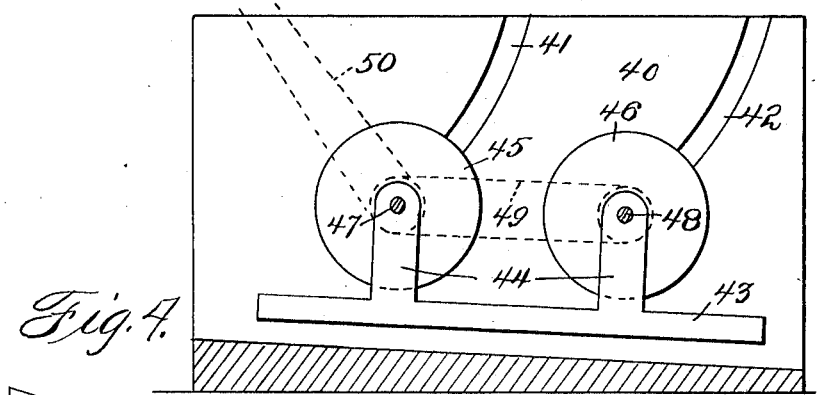
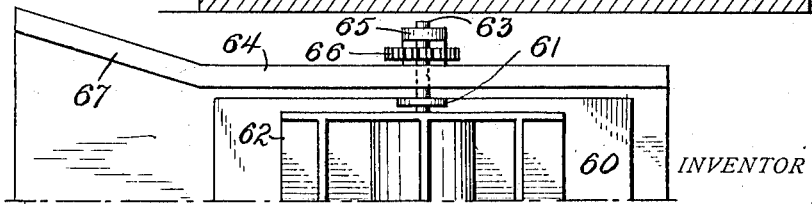
WITNESSES
INVENTOR
Thomas H. Downward
Attorney

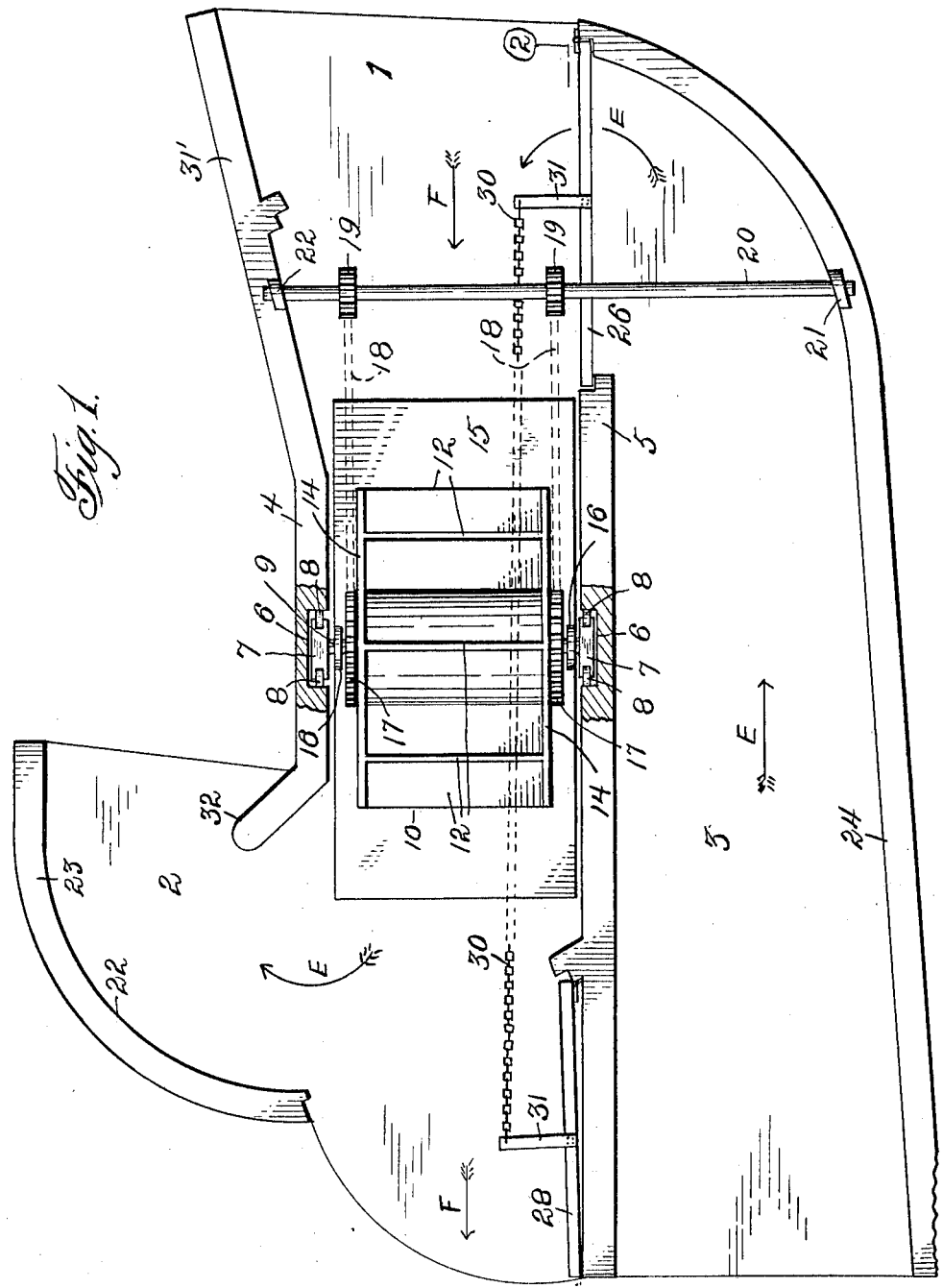

UNITED STATES PATENT OFFICE.

THOMAS H. DOWNWARD, OF PHILADELPHIA, PENNSYLVANIA.

WATER-POWER SYSTEM.

1,048,664.   Specification of Letters Patent.   Patented Dec. 31, 1912.

Application filed August 14, 1911. Serial No. 643,941.

*To all whom it may concern:*

Be it known that I, THOMAS H. DOWNWARD, a citizen of the United States, residing at Philadelphia, in the county of Philadelphia and State of Pennsylvania, have invented certain new and useful Improvements in Water-Power Systems, of which the following is a specification.

This invention relates to improvements in water power systems, and more particularly to current motors for tide waters.

The object of the invention is to provide a current motor which will rise and fall with the tide while being operated by the current in the same direction for both tides. And a further object of the invention is to provide means for automatically directing the water of both tides to flow so as to rotate the water wheel in one direction.

Reference will be had to the accompanying drawing forming a part of this specification and wherein like numerals of reference designate corresponding parts throughout the several views, in which:

Figure 1 is a top plan view, Fig. 2 is a vertical sectional view therethrough on line 2—2, Fig. 3 is an elevation of the shaft bearings in place in a fragment of the bearing wall, Fig. 4, is a view similar to Fig. 3 of a modified form, and Fig. 5 is a half view in top plan of another modified form.

Reference numeral 1 designates the central water-way, and 2 and 3 the opposite side water-ways, both communicating with the water-way 1 at opposite ends of the latter. The parallel walls 4 and 5 of the central water-way are provided with arc-shaped bearing or guide grooves 6 within which are confined bearing blocks 7. Within these blocks 7, at opposite sides thereof are anti-friction rollers 8 which travel up and down the side walls of the guide grooves 6. Journaled in the blocks 7, substantially centrally thereof, is a shaft 9 on which is fixedly mounted a water power wheel 10. This wheel 10 may be of any desired form, though in the drawings, is shown as being composed of a central barrel or hub 11 and radial blades 12, and side members 14. The wheel 10 is supported by a float 15, being journaled in brackets 16 thereof. Fixed to the shaft 9, are also sprocket or gear wheels 17, (see Fig. 1) from which power is taken by means of belts or sprocket chains 18 leading to gear or sprocket wheels 19 of driven shaft 20, which latter is journaled in brackets 21 and 22. The bracket 21 is mounted on the said wall 24, while the bracket 22 is mounted on a wall 31'. The wall 23 is arc-shaped, the center of the arc being virtually the adjacent end of the said wall 4, and said arc-shaped wall 23 is spaced from the said wall 4 to produce the said side-water-way 2. Extending longitudinally to the said wall 5 and taperingly spaced therefrom is a wall 24, one end of which is also arc-shaped and spaced from the end of the wall 5. This wall 24 and the wall 5 produce the said water-way 3.

Between the end of the wall 24 and the adjacent end of the wall 5 is a hinged gate 26 which may swing to close the opening between the said walls, or the opening between the wall 24 and the wall 31'. Between the end of the wall 23 and the wall 5 and to the latter is hinged a second gate 28 for closing the space between the said walls 23 and 5. These two gates 26 and 28 are connected together by means of chain 30 attached to brackets 31 on the gates.

Arrows E and F indicate the direction of the water flow through the water-ways during ebb and flood tides; E indicating the ebb flow, and F the flood flow.

In use, the device is disposed longitudinally of the river with the right hand end (see Fig. 1) downstream.

In operation, when the tide is flooding, the water enters the right-hand end of the central water-way 1 and passes therethrough beneath the water wheel 10 and thence out through the opening between the walls 5 and 23. The entering water will automatically swing the gates to the positions shown in the drawings, to close the opening between the walls 5 and 24 and to open the opening between the walls 5 and 23. Any water that may enter the water-way 2 from the outside, will flow out through the opening between walls 5 and 23 without interfering with the action of the water wheel. On the ebb tide, the water will enter the water-way 3 at the left, and will automatically swing the gate 26 to open the opening between the walls 5 and 24 and to close the opening between the walls 31' and 24, and the gate 28 being connected with the gate 26, will be swung to close the opening between the walls 5 and 23. As soon as these gates are closed as described, the water will flow from the water-way 3 into the water-way 1, beneath the water wheel 10, and then through the water-way 2 into the river in the same direction in which the river is flowing. The wall 4 is provided with angular portions 31' and 32, the former providing a funnel shaped entrance for the water to the wheel pit, and the latter serving to deflect the current entering the water-way 2 on flood tide to prevent the same interfering with the action of the water wheel.

The buoyancy of the float 15, is only sufficient to keep the under portion of the water wheel submerged, and it might also be well to mention that the barrel or hub portion 11 of the water wheel is also of a buoyant nature to assist the main float 15 in preventing too deep submergence of the water wheel. As the tides rise and fall, the water wheel will correspondingly move maintaining at all times a fixed relation between the water wheel and surface of the water. As the water wheel is raised and lowered, its bearing blocks travel in the arc-shaped guide grooves 6, and as the center of the arc is the driven shaft 20, the belt or sprocket chain 18 will neither slacken nor tighten. Power may be taken from the shaft 20 for any desired purposes.

In the modified form, Fig. 4, 40 indicates one wall of the wheel pit, and in this wall and its opposite wall (not shown) are provided arc-shaped guide grooves 41 and 42. Within the wheel pit is provided a float 43, in brackets 44 of which are journaled a plurality of wheels 45 and 46. The shafts 47 and 48 thereof, to which the wheels are fixed, are journaled in bearing blocks similar to those illustrated in Fig. 3, and these blocks travel in the said guide grooves 41 and 42. The water wheels are coupled together by belts or sprocket chain 49 and through belt or sprocket chain 50 power is supplied to a shaft similar to that 20 of Fig. 2.

In the modified form Fig. 5, the arrangement is suitable for rivers and streams having no tide, but the construction being such as to cause the wheel to adjust itself to the varying heights of the river or stream during dry and rainy seasons. In this form, 60 indicates the float, in brackets 61 of which is journaled the water wheel 62, the shaft 63 thereof extending through the masonry pit wall 64 and being journaled in bearings 65 and supplied with gear wheel 66 from which power may be taken. The mouth of the sluice is funnel shaped as indicated by numeral 67.

What is claimed as new and useful is:

1. In a water power, inner walls, a water-wheel located therebetween, an outer wall spaced from the end of one of the inner walls, a second outer wall spaced from the end of the other inner wall, and connected gates controlling the openings between the inner and outer walls.

2. In a water power, inner walls, a water-wheel located therebetween, an outer wall spaced from the end of one of the inner walls, a second outer wall spaced from the opposite end of the other inner wall, and connected gates swinging in the same direction and controlling the openings between the inner and outer walls.

3. In a water power, spaced walls, a water-wheel located between some of the walls, said spaced walls comprising means for causing the current of both ebb and flood tides to flow in one direction through the water-wheel, and connected gates controlling the space between some of the walls.

4. In a water power, spaced walls, a water-wheel located between some of the walls, said spaced walls comprising means for causing the current of both ebb and flood tides to flow in one direction through the water-wheel, and connected gates swinging in the same direction and controlling the space between some of the walls.

5. In a water power, a water-wheel, a power shaft, said water-wheel being journaled in bearing blocks, arc-shaped guideways in which the bearing blocks are slidable, the center of the arc of the guide-ways being the power-shaft, and means connecting the water-wheel and power shaft.

6. In a water power, a water-wheel, a power shaft, said water-wheel being journaled in bearing blocks, said bearing blocks being provided with anti-friction rollers, arc-shaped guide-ways in which the bearing blocks are slidable, the center of the arc of the guide-ways being the power shaft, and means connecting the water-wheel and power shaft.

7. In a water power, spaced walls providing a central water-way and outer water-ways on opposite sides thereof, the outer water-ways connecting with the central water-way at opposite ends and sides thereof, a swinging gate controlling one end of the central water-way and one of the outer water-ways, and a similarly swinging gate controlling the other end of the central water-way, and a water-wheel arranged within the central water-way and being adapted to raise and lower with the tides.

8. In a water power, a water wheel, vertical guides therefor, and a float supporting the water wheel and being entirely free from the said guides.

9. In a water power, an inner wall, an outer wall spaced from one end thereof, a second inner wall spaced from the first inner wall, a second outer wall spaced from the end of the second inner wall, a water wheel between the two inner walls, a gate controlling the entire opening between the first inner and second outer walls.

10. In a water power, an inner wall, an outer wall spaced from one end thereof, a second inner wall spaced from the first inner wall, a second outer wall spaced from the end of the second inner wall, a water wheel between the two inner walls, a gate controlling the entire opening between the first inner and second outer walls, and a gate controlling the entire opening between the first outer and second inner walls.

11. In a water power, an inner wall, an outer outwardly bulging wall spaced from one end thereof, a second inner wall spaced from the first inner wall, a second outer outwardly bulging wall spaced from the opposite end of the second inner wall, a water wheel between the two inner walls, a gate controlling the entire opening between the first inner and second outer walls, and a gate controlling the entire opening between the first outer and second inner walls.

In testimony whereof I affix my signature in presence of two witnesses.

THOMAS H. DOWNWARD.

Witnesses:
   THOMAS D. SIMPSON,
   WALTER W. CALMORE.

Copies of this patent may be obtained for five cents each, by addressing the "Commissioner of Patents, Washington, D. C."